(12) United States Patent
Wang et al.

(10) Patent No.: US 9,693,016 B2
(45) Date of Patent: Jun. 27, 2017

(54) DATA PROCESSING METHOD, DATA PROCESSING APPARATUS AND ELECTRONIC DEVICE

(71) Applicants: Beijing Lenovo Software Ltd., Beijing (CN); Lenovo (Beijing) Co., Ltd., Beijing (CN)

(72) Inventors: Hongguang Wang, Beijing (CN); Lei Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 33 days.

(21) Appl. No.: 14/230,152

(22) Filed: Mar. 31, 2014

(65) Prior Publication Data
US 2014/0300683 A1 Oct. 9, 2014

(30) Foreign Application Priority Data
Apr. 3, 2013 (CN) .......................... 2013 1 0115909

(51) Int. Cl.
*H04N 7/14* (2006.01)
(52) U.S. Cl.
CPC .................................. *H04N 7/147* (2013.01)
(58) Field of Classification Search
None
See application file for complete search history.

(56) References Cited

U.S. PATENT DOCUMENTS

| 8,581,953 | B2 * | 11/2013 | Kim | ....................... | H04N 7/147 348/14.01 |
|---|---|---|---|---|---|
| 8,860,776 | B2 | 10/2014 | Long et al. | | |
| 2007/0139512 | A1 * | 6/2007 | Hada | ....................... | G06F 3/011 348/14.01 |

(Continued)

FOREIGN PATENT DOCUMENTS

| CN | 101005609 A | 7/2007 |
|---|---|---|
| CN | 101370115 A | 2/2009 |
| CN | 102271241 A | 12/2011 |

OTHER PUBLICATIONS

First Chinese Office Action regarding Application No. 201310115909.7 dated Oct. 21, 2016. English translation provided by Unitalen Attorneys at Law.

*Primary Examiner* — Maria El-Zoobi
(74) *Attorney, Agent, or Firm* — Harness, Dickey & Pierce, P.L.C.

(57) ABSTRACT

A data processing method, a data processing apparatus and an electronic device are provided. The method includes: receiving second communication data from a second communication device, in the case where a data path is established between the first communication device and the second communication device; displaying, by the first display unit, a second content corresponding to the second communication data; collecting, by the first input unit, a first operation of a user of the first communication device; determining, based on the first operation, a second processing instruction for transforming the second content, in the case where the first operation meets a first predetermined condition; and controlling, in response to the second processing instruction, the first display unit and/or a second display unit to display third content associated with the second content.

15 Claims, 12 Drawing Sheets

(56) References Cited

U.S. PATENT DOCUMENTS

| | | |
|---|---|---|
| 2008/0115186 A1 | 5/2008 | Cho |
| 2008/0291218 A1 | 11/2008 | Sheng et al. |
| 2010/0134588 A1 | 6/2010 | Kim |
| 2011/0193932 A1 | 8/2011 | Long et al. |
| 2011/0249073 A1* | 10/2011 | Cranfill .................. H04N 7/147 348/14.02 |

* cited by examiner first moment  second moment  third moment first moment  second moment  third moment

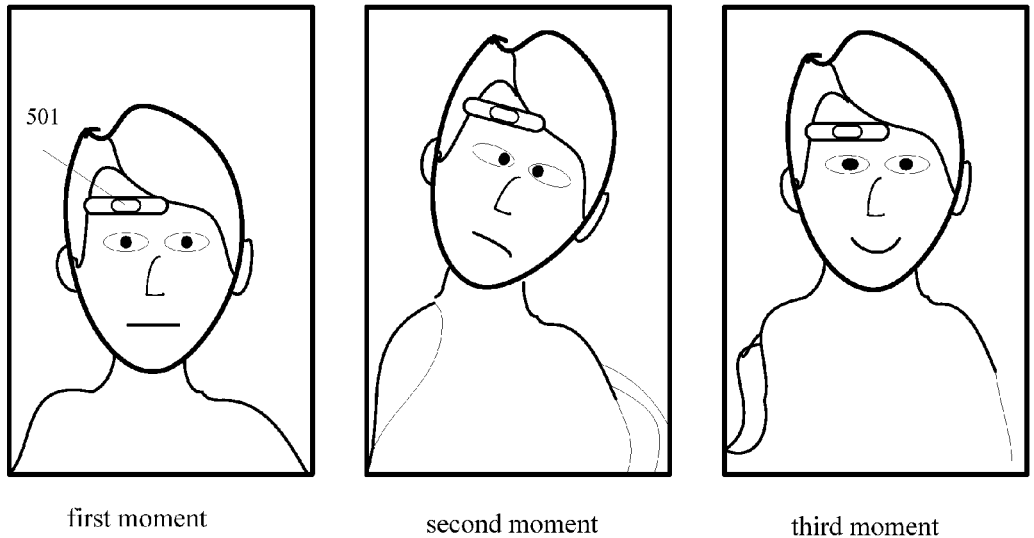

| | | |
|---|---|---|
| A] ▯ ▯ ▯ ▯ ▯ ▯<br>B] ▯ ▯ ▯ ▯ ▯ ▯<br>A] how is the weather up there ?<br>B: weather is NOT fine today | B] ▯ ▯ ▯ ▯ ▯ ▯<br>A] how is the weather up there ?<br>B: weather is NOT fine today<br>A: Aha | A] how is the weather up there ?<br>B: weather is NOT fine today<br>A: Aha<br>B] ▯ ▯ ▯ ▯ ▯ ▯ |
| first moment | second moment | third moment |

DATA PROCESSING METHOD, DATA PROCESSING APPARATUS AND ELECTRONIC DEVICE

This application claims the priority to Chinese Patent Application No. 201310115909.7, entitled "DATA PROCESSING METHOD, DATA PROCESSING APPARATUS AND ELECTRONIC DEVICE", filed with the Chinese Patent Office on Apr. 3, 2013, which is incorporated by reference in its entirety herein.

FIELD

The present disclosure relates to the field of communication technology, and in particular to a data processing method, a data processing apparatus and an electronic device.

BACKGROUND

Video communication is convenient for a communication between users. In the video communication, each of two parties of the video communication may receive video image data transmitted from an opposite party, and see the video image of the opposite party. However, the displayed image is only the image obtained from the opposite party, and the users may not perform more emotional or behavioral communication in the video communication. For example, in the video communication, the change in the body or expression of a user of the opposite party, which is caused by the behavior of the local user, may not be reflected intuitively. Thus, fun and interactivity of the two parties in the video communication need to be improved.

SUMMARY

In view of the above, a data processing method, a data processing apparatus and an electronic device is provided, to provide the fun for two parties of the communication and improve the effect of the communication.

In order to achieve the above-mentioned object, a data processing method is provided, which is applied to a first communication device which includes or is connected to a first display unit and a first input unit. The method includes:

receiving second communication data from a second communication device, in the case where a data path is established between the first communication device and the second communication device, wherein the second communication device includes or is connected to a second collecting unit and the second communication data is collected by the second collecting unit;

displaying, by the first display unit, a second content corresponding to the second communication data;

collecting, by the first input unit, a first operation of a user of the first communication device;

determining, based on the first operation, a second processing instruction for transforming the second content, in the case where the first operation meets a first predetermined condition; and controlling, in response to the second processing instruction, the first display unit and/or a second display unit to display a third content associated with the second content, wherein the second communication device includes or is connected to the second display unit.

Preferably, the controlling, in response to the second processing instruction, the first display unit and/or a second display unit to display a third content associated with the second content includes:

transforming, in response to the second processing instruction, the second content displayed by the first display unit into the third content; and/or transmitting the second processing instruction to the second communication device; and transforming, by the second communication device, a content displayed by the second display unit and associated with the second communication data into the third content, in response to the second processing instruction.

Preferably, the transforming, in response to the second processing instruction, the second content displayed by the first display unit into the third content includes:

transforming, in response to the second processing instruction, the second content displayed by the first display unit into the third content, transmitting the third content to the second communication device, wherein the second display unit displays the third content.

Preferably, the determining, based on the first operation, a second processing instruction for transforming the second content, in the case where the first operation meets a first predetermined condition includes:

determining, based on the first operation, a location region to be processed in the second content; and determining the second processing instruction for transforming a content in the location region to be processed, in the case where the first operation meets the first predetermined condition; and the controlling, in response to the second processing instruction, the first display unit and/or a second display unit to display a third content associated with the second content includes:

controlling, in response to the second processing instruction, to transform a content in the location region to be processed in the second content displayed by the first display unit, and/or a content in the location region to be processed in a forth content which is displayed by the second display unit and associated with the second communication data, wherein the first display unit and/or the second display unit display the third content.

Preferably, the controlling to transform a content in the location region to be processed in the second content displayed by the first display unit, and/or a content in the location region to be processed in a forth content displayed by the second display unit and associated with the second communication data includes:

controlling to transform the content in the location region to be processed in the second content currently displayed by the first display unit, and/or the content in the location region to be processed in the forth content currently displayed by the second display unit;

controlling to transform the content in the location region to be processed in the second content displayed by the first display unit, and/or the content in the location region to be processed in the forth content displayed by the second display unit, in a predetermined period from a current moment; or controlling to transform the content in the location region to be processed in the second content displayed by the first display unit and/or the content in the location region to be processed in the forth content displayed by the second display unit, in a period from the current moment to a moment when an instruction for canceling a transformation is received.

Preferably, the determining, based on the first operation, a second processing instruction for transforming the second content, in the case where the first operation meets a first predetermined condition includes:

determining, based on the first operation, a first object to be processed in the second content; and determining the second processing instruction for the first object, in the case where the first operation meets the first predetermined condition; and the controlling, in response to the second processing instruction, the first display unit and/or a second display unit to display third content associated with the second content includes:

controlling, in response to the second processing instruction, to transform the first object displayed by the first display unit and/or the second display unit; and displaying the third content with the transformed first object at the first display unit and/or the second display unit.

Preferably, the controlling, in response to the second processing instruction, to transform the first object displayed by the first display unit and/or the second display unit includes:

controlling, in response to the second processing instruction, to transform a first portion of the first object currently displayed by the first display unit and/or the second display unit;

controlling, in response to the second processing instruction, to transform the first object displayed by the first display unit and/or the second display unit, during a predetermined period from a current moment; or controlling, in response to the second processing instruction, to transform the first object displayed by the first display unit and/or the second display unit, in a time period from the current moment to a moment when an instruction for canceling a transformation is received.

Preferably, the receiving second communication data from a second communication device, in the case where a data path is established between the first communication device and a second communication device includes:

receiving second video data from the second communication device, in the case where a video communication path is established between the first communication device and the second communication device, wherein the second video data is collected by the second collecting unit;

the displaying, by the first display unit, a second content corresponding to the second communication data includes: displaying, by the first display unit, a second video image corresponding to the second video data; and the controlling, in response to the second processing instruction, the first display unit and/or a second display unit to display a third content associated with the second content includes:

controlling, in response to the second processing instruction, to transform the second video image displayed by the first display unit and/or a fourth video image displayed by the second display unit, and displaying a third video image by the first display unit and/or the second display unit, wherein an image content in the fourth video image is the same as an image content in the second video image.

Preferably, the receiving second communication data from the second communication device includes:

receiving the second communication data from the second communication device, wherein the second communication data includes at least one character to be output;

the displaying, by the first display unit, a second content corresponding to the second communication data includes:

outputting, by the first display unit, the character to be output in the second communication data; and the controlling, in response to the second processing instruction, the first display unit and/or a second display unit to display a third content associated with the second content includes:

controlling, in response to the second processing instruction, to change a rendering effect of the character output by the first display unit and/or the second display unit.

Preferably, the controlling, in response to the second processing instruction, the first display unit and/or a second display unit to display a third content associated with the second content includes:

determining, in response to the second processing instruction, a transforming mode for the second content, wherein the transforming mode includes an addition, modification and/or deletion of an object in a preset region of the second content; and controlling the first display unit and/or the second display unit to display the third content is obtained by transforming the second content in the transforming mode.

Preferably, the determining, based on the first operation, a second processing instruction for transforming the second content includes:

determining, based on the first operation, the second processing instruction for transforming the second content and an audio processing instruction associated with the corresponding transformation; and when the controlling, in response to the second processing instruction, the first display unit and/or a second display unit to display a third content associated with the second content, the method further includes:

controlling, in response to the audio processing instruction, the first display unit and/or the second display unit to output corresponding audio.

Preferably, the first communication device includes or is connected to a first collecting unit;

the displaying, by the first display unit, a second content corresponding to the second communication data includes:

displaying, in a first display region of the first display unit, a first content corresponding to first communication data collected by the first collecting unit, and displaying, in a second display region of the first display unit, the second content corresponding to the second communication data; and the controlling, in response to the second processing instruction, the first display unit and/or a second display unit to display a third content associated with the second content includes:

controlling, in response to the second processing instruction, to display the third content associated with the second content in the second display region of the first display unit, wherein the second display region is different from the first display region; and/or controlling, in response to the second processing instruction, the second communication device to display the third content corresponding to the second content in a third display region of the second display unit, and triggering the second communication device to adjust a display area of the third display region.

Preferably, when the receiving second communication data from a second communication device in the case where a data path is established between the first communication device and a second communication device, the method further includes:

transmitting the first communication data collected by the first collecting unit to the second communication device, wherein the first content corresponding to the first communication data is displayed at a fourth display region of the second display unit, and the fourth display region is different from the third display region;

collecting, by the first input unit, a second operation of the user of the first communication device on the first content;

determining, based on the second operation, a first processing instruction for transforming the first content, in the case where the second operation meets a second predetermined condition; and displaying, in response to the first processing instruction, the transformed first content in the first display region of the first display unit and/or the fourth display region of the second display unit.

In another aspect, a data processing apparatus is provided, which is applied to a first communication device which includes or is connected to a first display unit and a first input unit. The apparatus includes:

a data receiving unit configured for receiving second communication data from a second communication device, in the case where a data path is established between the first communication device and the second communication device, wherein the second communication device includes or is connected to a second collecting unit and the second communication data is collected by the second collecting unit;

a content display unit configured for displaying a second content corresponding to the second communication data by the first display unit;

an operation acquisition unit configured for collecting a first operation of a user of the first communication device by the first input unit;

an instruction determination unit configured for determining, based on the first operation, a second processing instruction for transforming the second content, in the case where the first operation meets a first predetermined condition; and a display control unit configured for controlling, in response to the second processing instruction, the first display unit and/or a second display unit to display a third content associated with the second content, wherein the second communication device includes or is connected to the second display unit.

Preferably, the display control unit includes one or more of:

a first display control unit configured for transforming, in response to the second processing instruction, the second content displayed by the first display unit into the third content; and a second display control unit configured for transmitting the second processing instruction to the second communication device, wherein the second communication device transforms a content displayed by the second display unit and associated with the second communication data into the third content, in response to the second processing instruction.

Preferably, the first display control unit includes:

a first display control sub-unit configured for transforming, in response to the second processing instruction, the second content displayed by the first display unit into the third content, and transmitting the third content to the second communication device, wherein the second display unit displays the third content.

Preferably, the instruction determination unit includes:

a location instruction determination unit configured for determining, based on the first operation, a location region to be processed in the second content, and determining the second processing instruction for transforming a content in the location region to be processed, in the case where the first operation meets the first predetermined condition; and the display control unit includes:

a region content transformation unit configured for controlling, in response to the second processing instruction, to transform a content in the location region to be processed in the second content displayed by the first display unit and/or a content in the location region to be processed in a forth content displayed by the second display unit and associated with the second communication data, wherein the third content is displayed by the first display unit and/or the second display unit.

Preferably, the region content transformation unit includes any one of:

a first region content transformation unit configured for controlling to transform a content in the location region to be processed in the second content currently displayed by the first display unit and/or a content in the location region to be processed in the forth content currently displayed by the second display unit;

a second region content transformation unit configured for controlling to transform the content in the location region to be processed in the second content displayed by the first display unit, and/or the content in the location region to be processed in the forth content displayed by the second display unit, in a predetermined period from a current moment; and a third region content transformation unit configured for controlling to transform the content in the location region to be processed in the second content displayed by the first display unit and/or the content in the location region to be processed in the forth content displayed by the second display unit, in a period from the current moment to a moment when an instruction for canceling a transformation is received.

Preferably, the instruction determination unit includes:

an object instruction determination unit configured for determining, based on the first operation, a first object to be processed in the second content and the second processing instruction for the first object, in the case where the first operation meets the first predetermined condition; and the display control unit includes:

an object content transformation unit configured for controlling, in response to the second processing instruction, to transform the first object displayed by the first display unit and/or the second display unit, and displaying the third content with the processed first object by the first display unit and/or the second display unit.

Preferably, the object content transformation unit includes any one of:

a first object content transformation unit configured for controlling, in response to the second processing instruction, to transform a first portion of the first object currently displayed by the first display unit and/or the second display unit;

a second object content transformation unit configured for controlling, in response to the second processing instruction, to transform the first object displayed by the first display unit and/or the second display unit, in a predetermined period from a current moment; and a third object content transformation unit configured for controlling, in response to the second processing instruction, to transform the first object displayed by the first display unit and/or the second display unit in a period from the current moment to a moment when an instruction for canceling a transformation is received.

Preferably, the data receiving unit includes:

a video data receiving unit configured for receiving second video data from the second communication device, in the case where a video communication path is established between the first communication device and the second communication device, wherein the second video data is collected by the second collecting unit;

the content display unit includes: a video image display unit configured for displaying a second video image corresponding to the second video data by the first display unit; and the display control unit includes:

a video image display control unit configured for controlling, in response to the second processing instruction, to perform an image transformation process on the second video image displayed by the first display unit and/or a fourth video image displayed by the second display unit, and display a third video image by the first display unit and/or the second display unit, wherein the image content in the fourth video image is the same as the image content in the second video image.

Preferably, the data receiving unit includes:

a character data receiving unit configured for receiving the second communication data from the second communication device, in the case where a video communication path is established between the first communication device and the second communication device, wherein the second communication data includes at least one character to be output;

the content display unit includes:

a character display unit configured for outputting, by the first display unit, the character to be output in the second communication data; and the display control unit includes:

a character display control unit configured for controlling, in response to the second processing instruction, to change a rendering effect of the character output by the first display unit and/or the second display unit.

Preferably, the instruction determination unit is configured for determining, based on the first operation, the second processing instruction for transforming the second content and an audio processing instruction associated with the corresponding transformation; and the apparatus further includes:

an audio output control unit configured for the controlling, in response to the audio processing instruction, the first display unit and/or a second display unit to output corresponding audio, when the display control unit controls the first display unit and/or the second display unit to display the third content associated with the second content.

Preferably, the first communication device includes or is connected to a first collecting unit;

the content display unit is configured for displaying, in a first display region of the first display unit, a first content corresponding to first communication data collected by the first collecting unit, and displaying the second content corresponding to the second communication data in a second display region of the first display unit; and the display control unit is configured for controlling, in response to the second processing instruction, to display the third content associated with the second content in the second display region of the first display unit, wherein the second display region is different from the first display region; and/or controlling, in response to the second processing instruction, the second communication device to display the third content corresponding to the second content in a third display region of the second display unit, and triggering the second communication device to adjust a display area of the third display region.

In yet another aspect, an electronic device is provided, which includes or is connected to a first display unit, wherein a first communication device includes or is connected to a first input unit, both the first display unit and the first input unit are connected to a processor of the electronic device, and the data processing apparatus according to any one of the above is built in the processor.

According to the above technical solution, compared with the prior art, a data processing method, a data processing apparatus and an electronic device are provided. In the method, in the case where the data path is established between the first communication device and the second communication device, the transformation of the second content corresponding to the second communication data from the second communication device terminal may be triggered by the first operation which meets the first predetermined condition, if the user of the first communication device wants to improve the interactivity in the communication. In this way, the transformed third content associated with the second content may be displayed by the first display unit of the first communication device terminal and/or the second display unit of the second communication device terminal. Therefore, the possibility to change the data content of the opposite party is provided, hence improving the interactivity and fun during communication.

BRIEF DESCRIPTION OF THE DRAWINGS

In order to more clearly illustrate the technical solutions in embodiments of the disclosure, in the following, accompanying drawings referred to describe the embodiments are introduced simply. Obviously, the accompanying drawings in the following description are just some embodiments recited in the disclosure. For those skilled in the art, other accompanying drawings can also be obtained based on these accompanying drawings provided herein without any creative work.

FIGS. 5a, 5b and 5c show schematic diagrams of first objects in a determined video image, where the first object is performed a transform process in three different modes respectively;

FIG. 6a shows a schematic diagram of a case where a character input from two communication parties are displayed in the display region at a first moment;

FIGS. 6b and 6c show schematic diagrams of objects to be processed in the displayed character, where the object is performed a transform processes in two modes with a data processing method according to the disclosure respectively;

FIGS. 7a and 7b show schematic diagrams of a case where a display area of a display region for displaying third content of a second display unit is adjusted under a control of a second communication device;

DETAILED DESCRIPTION OF THE EMBODIMENTS

Hereinafter, the technical solutions in embodiments of the present disclosure are described clearly and completely in conjunction with the accompanying drawings of the embodiments of the present disclosure. It is obvious that the described embodiments are only a part of embodiments of the present disclosure. Other embodiments obtained by those skilled in the art on the basis of the embodiments of the present disclosure without creative work fall into the scope of protection of the present disclosure.

A data processing method is provided according to the embodiments of the present disclosure, to improve fun during communication and increase an interactivity of users.

Figure 1:
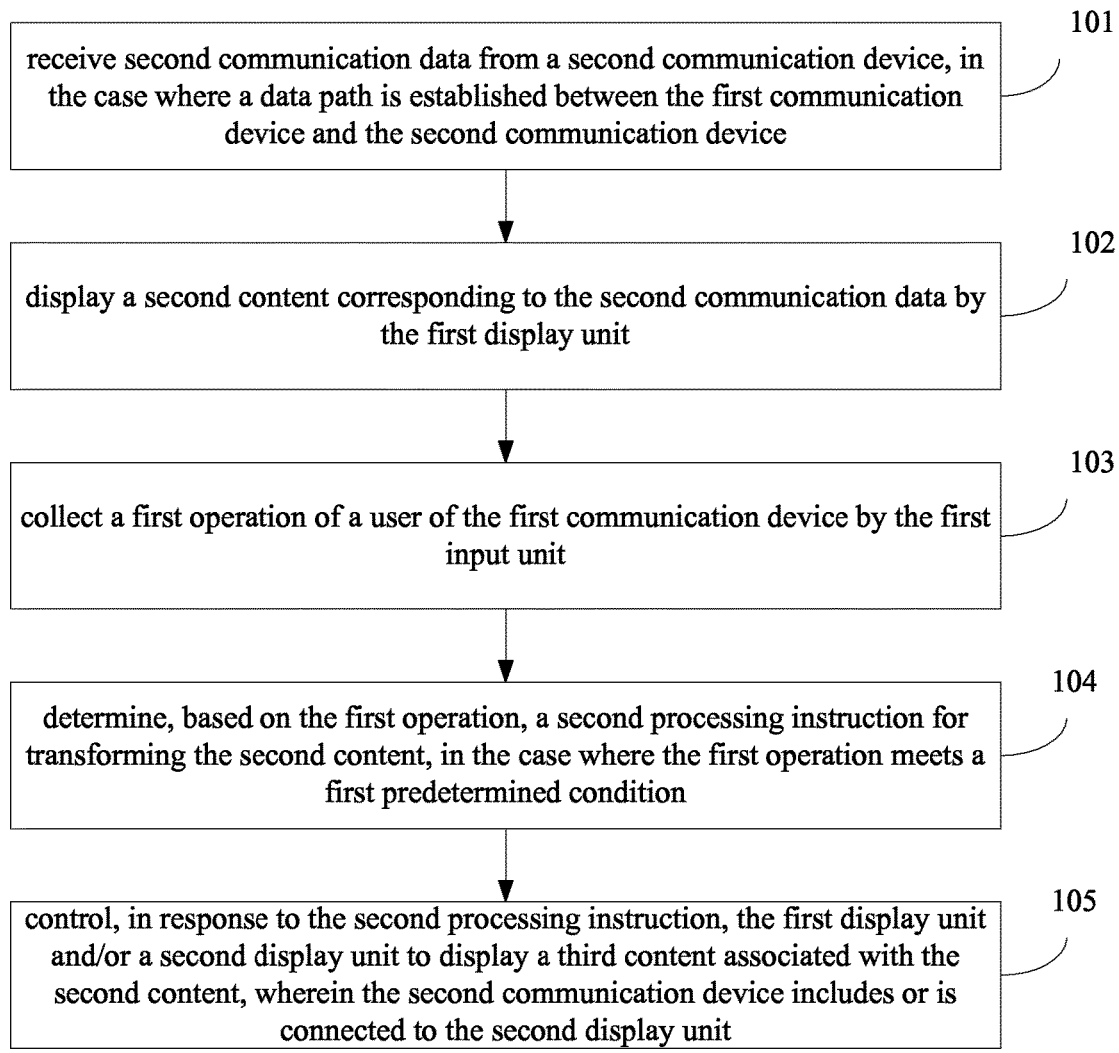
FIG. 1 shows a schematic diagram of a flowchart of a data processing method according to an embodiment of the disclosure.

Reference is made to FIG. 1, which shows a schematic flowchart of a data processing method according to an embodiment of the present disclosure. The method according to this embodiment is applied to a first communication device which includes or is connected to a first display unit and a first input unit. The method according to this embodiment includes Step 101 to Step 105.

Step 101 is to receive second communication data from a second communication device, in the case where a data path is established between the first communication device and the second communication device.

The second communication device includes or is connected to a second collecting unit and the second communication data is collected by the second collecting unit. The second collecting unit may be a camera or a keyboard.

In the method according to the embodiment of the disclosure, the first communication device may be an electronic device, such as a laptop, a desktop, a pad and a mobile phone. A data path may be established between the first communication device and the second communication device. The second communication device may also be an electronic device, such as a laptop, a desktop, a pad and a mobile phone.

The first communication device may receive the data collected in a timely manner by the second collecting unit of the second communication device, in the case where the first communication device and the second communication device maintains the established data path. For example, the second communication device collects video data of the second communication device terminal by a camera, and transmits the currently collected video data to the first communication device via the data path; alternatively, the second collecting unit of the second communication device collects the data such as a character or graphic input currently by the user via a keyboard or a mouse, in the case where there is the data path between the first communication device and the second communication device.

Step 102 is to display a second content corresponding to the second communication data by the first display unit.

The first communication device receives the second communication data via the data path, and then outputs the second content corresponding to the second communication data in the first display unit of the first communication device. In this way, the date content collected by the second collecting unit of the second communication device may be displayed in a timely manner.

The second content may vary with the different type of the received second communication data.

Step 103 is to collect a first operation of a user of the first communication device by the first input unit.

In the case that the data path between the first communication device and the second communication device is maintained and the second content corresponding to the second communication data from the second communication device is displayed, the first input unit of the first communication device collects the input operation of the local user, and then the first communication device obtains the first operation collected by the first input unit.

Step 104 is to determine, based on the first operation, a second processing instruction for transforming the second content, in the case where the first operation meets a first predetermined condition.

If the first operation collected by the first input unit meets the first predetermined condition, it is indicated that the user of the first communication device wants to make some change on the content displayed in the first display unit. Therefore, a transformation process on the second content is determined based on specific operation information of the first operation to obtain the second processing instruction.

The first predetermined condition met by the first operation may be set as required. For example, the first operation is a special operation on the second content, or the first operation clicks a trigger key associated with the second content. Accordingly, the first input unit for acquiring the first operation may be a touch sensing unit or a button or a keyboard input device. For example, if the second content is a second video image, the first operation meeting the first predetermined condition may be a sliding operation or a touch operation on the second video image.

Step 105 is to control, in response to the second processing instruction, the first display unit and/or a second display unit to display a third content associated with the second content, wherein the second communication device includes or is connected to the second display unit.

In response to the obtained second processing instruction, the first communication device may control the first display unit thereof to display the third content associated with the second content. Alternatively, in response to the second processing instruction, the second communication device controls the second display unit to display the third content associated with the second content.

The step of controlling the first display unit to display the third content by the first communication device includes: transforming, by the first communication device, the second content displayed by the first display unit into the third content in response to the second processing instruction. In this way, when generating the second processing instruction, the first communication device transforms, according to the second processing instruction, the second content displayed in the first display unit into the third content, and displays the third content transformed from the second content in the first display unit.

Furthermore, to display the third content on the second display unit of the second communication device, the first communication device transforms the second content, in response to the second processing instruction, and transmits the obtained third content to the second communication device to display the third content in the second display unit of the second communication device terminal. When transforming the second content into the third content and transmitting the third content to the second communication device, the first communication device may control to display the third content in the first display unit. Alternatively, the first communication device may only transmit the third content to the second communication device to display the third content only in the second display unit.

In addition, after the second processing instruction is determined, the step of controlling, in response to the second processing instruction, the second display unit to display the third content also includes: transmitting the second processing instruction to the second communication device; transforming, by the second communication device, content displayed by the second display unit of the second communication device and associated with the second communication data into the third content, in response to the second processing instruction; and displaying the third content in the second display unit. In practical applications, when the second collecting unit collects the second communication data and the second communication data is transmitted to the first communication device via the data path, the second communication device may also display the content associated with the second communication data in the second display unit. In general, the content displayed by the second display unit and associated with the second communication data is the same as the content in the second content displayed by the first display unit of the first communication device terminal. Thus, after the second processing instruction is transmitted to the second communication device, the second communication device transforms the content displayed by the second display unit and associated with the second communication data in response to the second processing instruction, and then the second display unit displays the third content obtained by the transformation.

It may be understood that, when the first communication device transmits the second processing instruction to the second communication device and the second communication device transforms the content displayed by the second display unit of the second communication device terminal and associated with the second communication data in response to the second processing instruction, the first communication device may also transform, in response to the second processing instruction, the second content in the first display unit of the first communication device terminal into the third content to display the third content.

In the embodiment of the present disclosure, the third content is obtained by transforming the second content or transforming the content displayed by the second display unit and associated with the second communication data in response to the processing instruction, and the content displayed by the second display unit and associated with the second communication data is the same as the substantial content included in the second content. Therefore, the third content is virtually a content transformed from the second content, and at least part of the third content is the same as the second content.

In the embodiment of the present disclosure, in the case where the first operation meets the first predetermined condition, the second processing instruction for the second content, which is determined based on the first operation, includes a required processing for the second content and a specific processing method. Thus, the method for obtaining, in response to the second processing instruction, the third content based on the second content may include: determining, in response to the second processing instruction, a transforming mode for the second content, and controlling the first display unit and/or the second display unit to display the third content transformed from the second content in the transforming mode. The transforming mode includes an addition, modification and/or deletion of an object in a set region of the second content. For example, a decoration object, such as a color rendering, or an image of an item, is added in the second content. As another example, the peripheral contour of a certain region of the second content is modified or a certain part of content is deleted.

In the embodiment of the present disclosure, in the case where there is the data path between the first communication device and the second communication device, the second communication data is received from the second communication device and the second content corresponding to the second communication data is displayed in the first display unit of the first communication device terminal. The second processing instruction for transforming the second content is determined based on the first operation, and the third content associated with the second content is displayed in the first display unit and/or the second display unit of the second communication device terminal in response to the second processing instruction, in the case where the first operation collected by the first input unit of the first communication device terminal meets the first predetermined condition. In this way, in the case where there is the data path between the first communication device and the second communication device, the transformation of the second content corresponding to the second communication data from the second communication device terminal may be triggered by a special operation, if the user of the first communication device wants to improve the interactivity in the communication. Therefore, the third content obtained by the transformation and associated with the second content may be displayed by the first display unit of the first communication device terminal and/or the second display unit of the second communication device terminal. Therefore, the possibility to change the content of the opposite terminal data is provided, hence improving the interactivity and fun during communication.

In practical applications, the second content displayed by the display unit of the first communication device may vary with the communication scene for the first communication data and the second communication data, and the communication data collected by the second collecting unit of the second communication device. Accordingly, the processing on the second content may is different.

In the case where a video communication is performed between the first communication device and the second communication device, i.e., in the case where there is a video communication path between the first communication device and the second communication device, the first communication device receives the second video data from the second communication device. The second video data is collected by the second collecting unit in the video communication. Accordingly, the first communication device may display a second video image corresponding to the second video data by the first display unit. This process is similar to the process of receiving video image data from the opposite terminal and displaying the video image of the opposite terminal at the local in the prior art.

In the case where there is the video communication path between the first communication device and the second communication device, the first communication device receives that the first operation meet the first predetermined condition, and then determines the second processing instruction for transforming the second video image based on the first operation. The first communication device controls, in response to the second processing instruction, to perform an image transformation process on the second content displayed by the first display unit and/or a fourth video image displayed by the second display unit. Thus, a third video image may be displayed by the first display unit and/or the second display unit. In general, when transmitting the collected second video data to the first communication device, the second communication device may display the image corresponding to the second video data, i.e., the fourth video image. Thus, the image content included in the fourth video image is the same as the image content included in the second video image. The method for controlling the transformation process on the second content displayed by the first display unit and/or the fourth video image displayed by the second display unit is the same as the process described above. For example, the process may include: transforming, in response to the second processing instruction, the second video image displayed by the first display unit, and displaying the transformed video image. Furthermore, the process may include: transmitting the third video image obtained by transforming the second video image to the second communication device, and displaying the third video image in the second display unit. The process may also include: transmitting the second processing instruction to the second communication device, to instruct the second communication device to transform the fourth video image displayed by the second display unit into the third video image in response to the second processing instruction; and display the third video image. The first display unit and the second display unit may display the third video image obtained by the transformation in any manner as described above at the same time.

Additionally, besides the above-mentioned transmission of video image communication, the first communication device and/or the second communication device may also transmit collected character data, and presents the corresponding character image, thus achieving the communication therebetween. In this way, the first communication device may also receive at least one character to be output which is collected by the second collecting unit of the second communication device terminal, in the case where there is the video communication path between the first communication device and the second communication device. In this case, the second collecting unit may be considered as a physical keyboard or a virtual keyboard. The second communication data collected by the second collecting unit includes actually a character input by the user of the second communication device. After the first communication device has received the character to be output, the first communication device outputs the character to be output, which is included in the second communication data, by the first display unit. Thus, the user of the first communication device may see the character output by the opposite terminal at the local. Accordingly, the second processing instruction determined based on the first operation is an instruction for transforming the character, in the case where the first operation obtained by the first input unit meets the first predetermined condition. The first communication device controls to change a rendering effect of the character output by the first display unit and/or the second display unit in response to the second processing instruction. For example, other characters may be added in the character output in the first display unit or a delete mark is added on the output character, thereby changing the rendering effect of the character output by the second communication device at the local. The changed character may be transmitted to the second communication device to display the changed character in the second display unit. The user of the second communication device may see the change to the effect of the character by the user of the first communication device. The first communication device may transmit the second processing instruction to the second communication device. The second communication device changes, in response to the second processing instruction, the corresponding character output by the second display unit. Thus, the user of the second communication device may see the corresponding change effect. Certainly, it is necessary to distinguish the added or deleted character by color or font.

Figure 2:
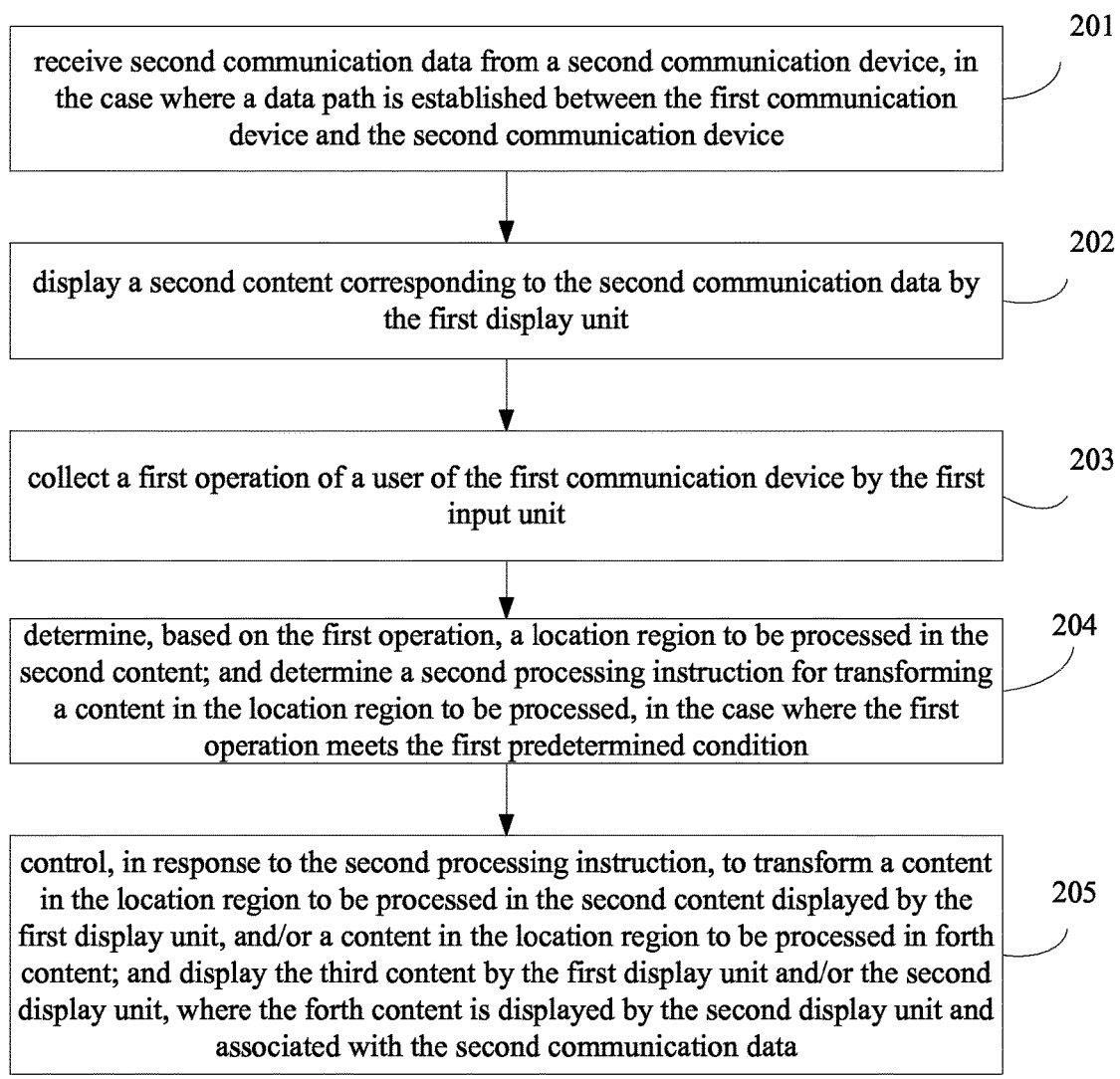
FIG. 2 shows a schematic diagram of a flowchart of a data processing method according to another embodiment of the disclosure.

Reference may be made to FIG. 2, which shows a schematic diagram of a flowchart of a data processing method according to another embodiment of the disclosure. The method according to the embodiment is applied to a first communication device which includes or is connected to a first display unit and a first input unit. The method according to the embodiment includes Step 201 to Step 205.

Step 201 is to receive second communication data from a second communication device, in the case where a data path is established between the first communication device and the second communication device.

The second communication device includes or is connected to a second collecting unit and the second communication data is collected by the second collecting unit.

Step 202 is to display a second content corresponding to the second communication data by the first display unit.

In the embodiment, the second communication data may either be video data collected by the second collecting unit, or be characters to be output, which is collected by the second communications device terminal via a second collecting unit such as a keyboard. Accordingly, the second content displayed by the first display unit may either be a video image, or output characters being displayed.

Step 203 is to collect a first operation of a user of the first communications device by the first input unit.

Those steps are similar to the operations of the previous embodiment, which will not be described in detail herein.

Step 204 is to determine, based on the first operation, a location region to be processed in the second content; and determine a second processing instruction for transforming a content in the location region to be processed, in the case where the first operation meets the first predetermined condition.

In some cases, the user needs to transform a part of the region in the second content displayed by the first display unit, to highlight the part of the region or to present some rendering effects of the transformed second content by transforming the part of the region. Therefore, the location region to be processed in the second content need to be determined, and the second processing instruction for transforming the content in the location region to be processed need to be determined based on the first operation. The second processing instruction is a transformation instruction for the specific location region in the second content.

There are many cases for determining a location region to be processed in the second content based on the first operation. The location region to be processed in the second content is determined according to the operation location of the first operation, in the case where the first operation is an operation, such as contacting, clicking or sliding on the second content, displayed by the first display unit. The location region to be processed is the location region in association with the button in the second content, in the case where the first operation is a clicking operation for a predetermined button.

Step 205 is to control, in response to the second processing instruction, to transform a content in the location region to be processed in the second content displayed by the first display unit, and/or a content in the location region to be processed in forth content; and display the third content by the first display unit and/or the second display unit, where the forth content is displayed by the second display unit and associated with the second communication data.

The second display unit is a display unit provided at the second communication device side. The second communication device includes the second display unit, or the second communication device is connected to the second display unit.

The second processing instruction includes information of the region to be processed in the second content, and information of processing the region to be processed. To obtain the third content, it is necessary to determine the region to be processed in the second content displayed by the first display unit and/or the region to be processed corresponding to the fourth content displayed by the second display unit, and then a process of the region to be processed is performed.

The third content may be displayed in the first display unit, in the second display unit, or in the first display unit and the second display unit at the same time.

When the third content needs to be displayed in the first display unit of the first communication device, the method may include: determining, in response to the second processing instruction, the region to be processed in the second content displayed by the first display unit, processing the region to be processed in the second content, and then displaying in the first display unit the third content obtained by transforming the content of the region to be processed in the second content.

When the third content needs to be displayed in the second display unit of the second communication device, the method may include: determining, by the first communication device, a region to be processed in the second content displayed at the first display unit in response to the second processing instruction; transforming the content of the region to be processed in the second content into the third content; and transmitting the third content to the second communication device to display the third content in the second display unit of the second communication device.

When the third content needs to be displayed in the second display unit of the second communication device, the method may further include: generating, by the first communication device, the second processing instruction based on the first operation; and transmitting to the second communication device information of the location region to be processed and the second processing instruction, where the second display unit determines the region to be processed in the fourth content displayed by the second communication device, transforms the content of the region to be processed in the fourth content into the third content and displays the third content. The fourth content corresponds to the second communication data, which is adapted to distinguish between the content displayed at the second communication device and corresponding to the second communication data and the content corresponding to the second communication data and displayed by the first communication device.

In the embodiment, the method for transforming the content of the region to be processed is similar to that according to the previous embodiment, which will not be described in detail herein.

In addition, the step of controlling, in response to the second processing instruction, to transform the region to be processed in the second content displayed by the first display unit or the region to be processed in the forth content displayed by the second display unit may be implemented in a various of modes. One implementation mode may include: controlling to transform a content in the location region to be processed in the second content currently displayed by the first display unit, and/or a content in the location region to be processed in the forth content currently displayed by the second display unit. In this implementation mode, only the region to be processed in the second content currently displayed by the first display unit is transformed in response to the second processing instruction, and any transformation process is not performed on the region to be processed in the second content displayed by the first display unit after the current moment and associated with the received second communication data. In this way, the first display unit keeps displaying the second content corresponding to the second communication data after the current moment. Similarly, if the second processing instruction is transmitted to the second communication device, the second communication device only transforms the region to be processed in the fourth content currently displayed by the second display unit in response to the second processing instruction, and any transformation process is not performed on the region to be processed in the fourth content displayed by the second display unit after the current moment and associated with the collected second communication data.

Another implementation mode may include: controlling to transform a content in the location region to be processed in the second content displayed by the first display unit and/or a content in the location region to be processed in the forth content displayed by the second display unit, in a predetermined period from a current moment. That is, in response to the second processing instruction, a transformation process is performed on the region to be processed in the second content displayed by the first display unit in the predetermined period, and/or the region to be processed in the forth content displayed by the second display unit in the predetermined period. In this way, the transformation effect of the region to be processed may keep for the predetermined period.

Another implementation mode may include: controlling to transform a content in the location region to be processed in the second content displayed by the first display unit and/or a content in the location region to be processed in the forth content displayed by the second display unit, in a period from the current moment to a moment when an instruction for canceling a transformation is received. In this mode, in response to the second processing instruction, a transformation process is performed on the region to be processed in the second content currently displayed by the first display unit and/or the region to be processed in the forth content currently displayed by the second display, to keep the transformation effect of the region to be processed, and the transformation process of the region to be processed in the second content and/or in the forth content is not terminated until an instruction for canceling a transformation is received.

Figure 3A:
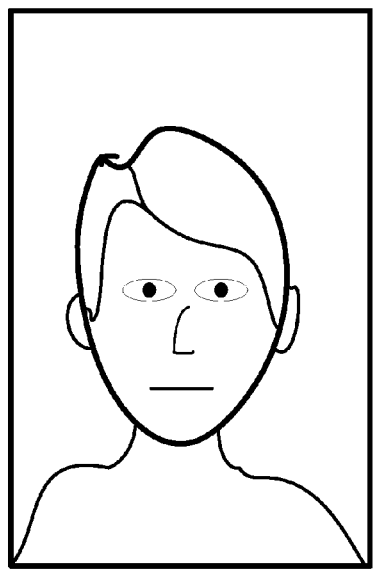
FIG. 3a shows a schematic diagram of a video image with a human face, where the video image is currently displayed in a first display region.

For example, a video communication path is established between the first communication device and the second communication device. During the maintenance of the video communication path, the first communication device receives a second video data collected by the second communication device via a camera; and displays a second video image corresponding to the second video data by the first display unit, as illustrated in FIG. 3a. FIG. 3a shows the second video image displayed by the first display unit. A human face is displayed in the second video image. When the user of the first communication device wants to present an rendering effect of the second video image in which the lower part of the second video image is hid with an object, the user may click a button in association with the lower part or perform a hiding action on the second video image, and the first communication device determines a processing instruction for hiding the lower part of the second video image based on the operation of the user.

Figure 3B:
FIGS. 3b and 3c show schematic diagrams of a predetermined location region of a determined video image, where the predetermined location region is performed a transform process in two different modes respectively.

When the second processing instruction is executed, the second video image may be displayed to be hid only at the current moment, but the video image corresponding to the later obtained second video data is not processed. The first diagram from the left in FIG. 3b is a diagram showing a rendering effect displayed by the first display unit, in which the lower part of the second video image is hid with a hand, that is, the transformation process is performed on the lower part of the image in FIG. 3a. The second and third diagrams from the left in FIG. 3b show the case where the lower part of the second video image displayed by the first display unit is not hid after the current moment. Of course, the transformation process of the second communication device on the region to be processed in the video image corresponding to the second video image and displayed by the second display unit in response to the second processing instruction is the same as that of the first communication device. Thus, the user of the second communication device terminal may only see that the lower part of the video image is hid by the user of the first communication device at the current moment, and the video image of the second display unit will not hid with a hand later.

Figure 3C:
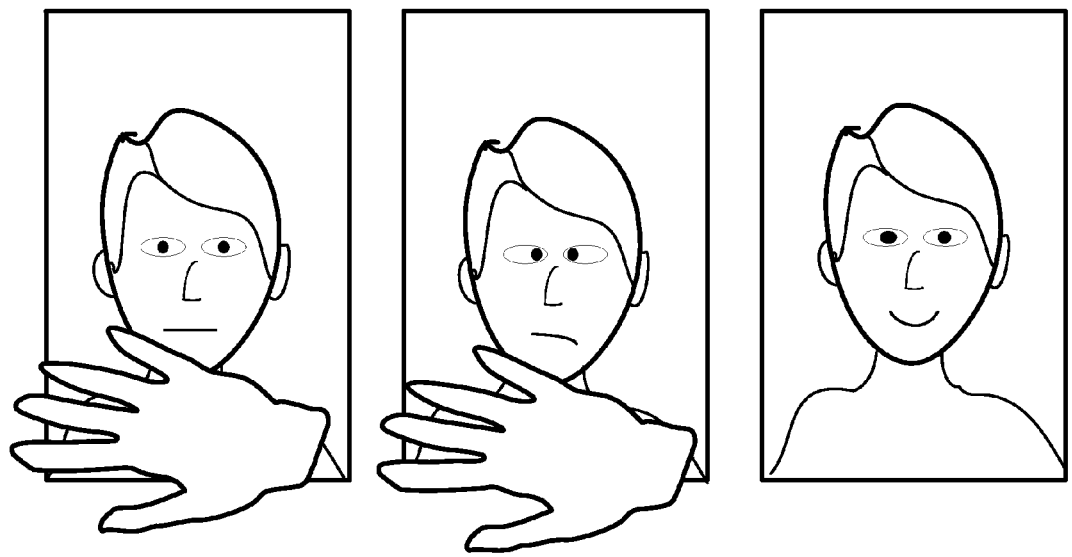

In addition, in response to the second processing instruction, the lower part of the second video image displayed after the current moment may also be hid with a hand, for a predetermined period or until an instruction for canceling a transformation is received. As illustrated in FIG. 3c, the first diagram from the left is a diagram showing a rendering effect in which the video image (i.e., the video image in FIG. 3a) displayed at the current moment is hid with a hand. The second diagram from the left is a schematic diagram in which the video image displayed by the first display unit is hid with a hand after the current moment. When the instruction for canceling the transformation is received or the predetermined period is reached, the video data transmitted by the second communication device is received again, and the first display unit only displays the video image corresponding to the obtained video data, without the hiding process, as illustrated in the third diagram from the left of FIG. 3c. Accordingly, the hiding effect with the hand may be present by the second display unit of the second communication device during a predetermined period from a current moment, or before the instruction for canceling the transformation is received, and the displaying procedure is the same as that shown in FIG. 3c.

Figure 4:
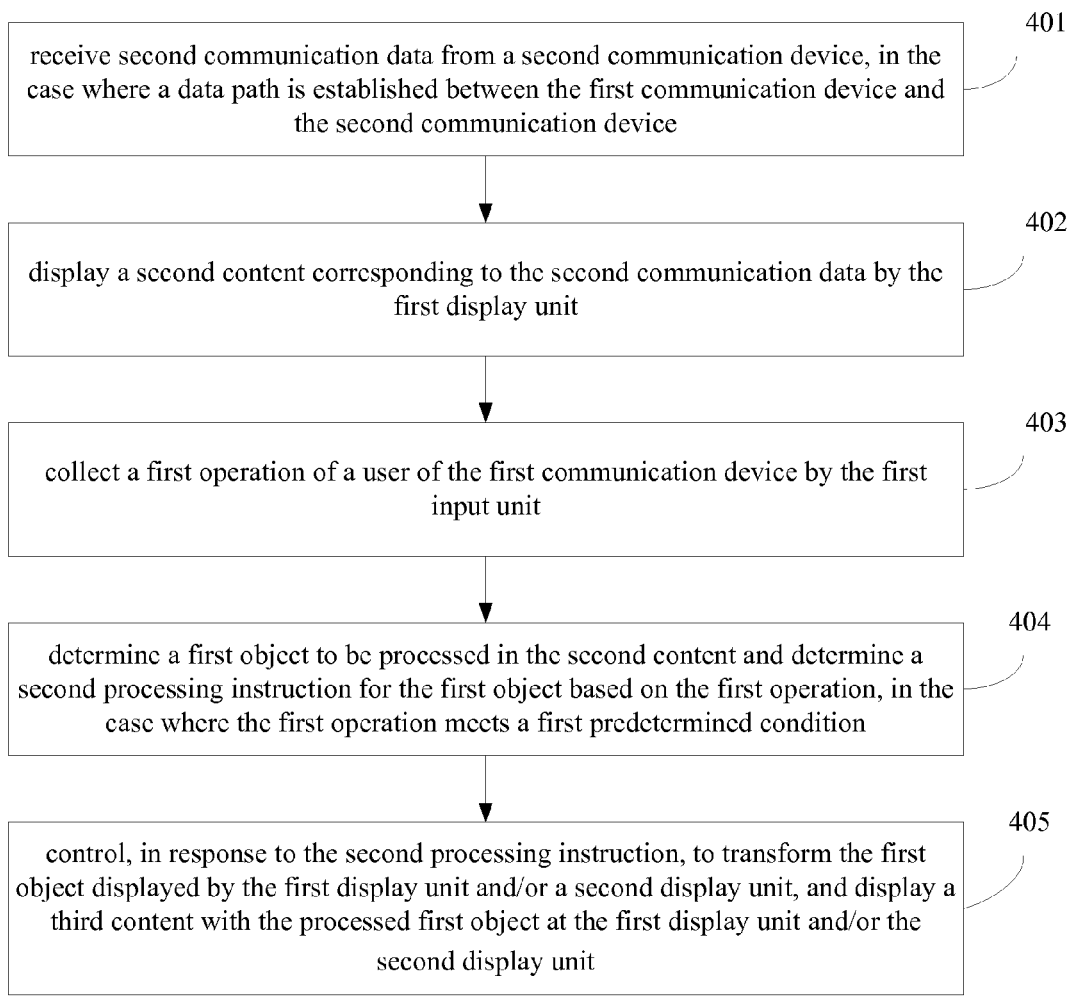
FIG. 4 shows a schematic diagram of a flowchart of a data processing method according to another embodiment of the disclosure.

Reference is made to FIG. 4, which shows a schematic diagram of a flowchart of a data processing method according to another embodiment of the disclosure. The method according to this embodiment is applied to a first communication device which includes or is connected to a first display unit and a first input unit. The method according to this embodiment includes Step 401 to Step 405.

Step 401 is to receive second communication data from the second communication device, in the case where a data path is established between the first communication device and a second communication device.

The second communication device includes or is connected to a second collecting unit and the second communication data is collected by the second collecting unit.

Step 402 is to display a second content corresponding to the second communication data by the first display unit.

In this embodiment, the second communication data received from the second communication device may be second video data collected by the second collecting unit of the second communication device. Correspondingly, the first display unit may display a second video image corresponding to the second video data.

The second communication data may also be at least one character to be output collected by the second collecting unit of the second communication device in a timely manner. Correspondingly, the first display unit displays the second content, i.e., displays the character to be output.

Step 403 is to collect a first operation of a user of the first communication device by the first input unit.

Those steps are similar to the operation of the above two embodiments, which will not be described in detail herein.

Step 404 is to determine a first object to be processed in the second content and determine a second processing instruction for the first object based on the first operation, in the case where the first operation meets a first predetermined condition.

According to this embodiment, the first object to be processed in the second content may be determined based on the first operation in the case where the first operation meets the first predetermined condition. The first object may be a character, a subject or a person in the second content; and may also be part of the character, subject or person. The second processing instruction is a processing instruction for the first object. Therefore, the second processing instruction is not limited to a position of the first object in the second content.

For example, the second content includes two persons, i.e., person A and person B. The first object determined based on the first operation may be the person A. The first object determined based on another first operation may be an eye of the person B.

The determined first object and the second processing instruction for the first object may vary with the different first objects for the user of the first communication device. The first operation may be an operation performed on the second content, such as touching, sliding or clicking. Correspondingly, the first input unit may be a touch sensing unit on the touch screen. Thus, when the first operation of the user on the second content is obtained, the first object corresponding to the current position of the first operation and the second processing instruction for the first object are both determined based on the position of the first operation on the second content. For example, in the case where a user M pinches the face of a user N on the displayed image by fingers, the first object is the face of the user N on the image, and the second processing instruction is adapted to transform the face of the user N correspondingly, so as to present the user N's face pinched by the user M.

The first operation may also be clicking a preset button which is associated with the objects included in the second content. Correspondingly, the first input unit may be the preset button. When an operation of the user clicking the preset button is obtained, the first object associated with the currently clicked preset button may be determined and the operation for the first object may be determined based on the association relationship. For example, a video image is displayed on the first display unit. It is assumed that a person A is displayed in the video image and the preset buttons are a button 1 and a button 2. The button 1 is used to trigger a touch on the head of the person, and the button 2 is used to trigger a slap in the face of the person. When a press for the button 2 is determined, it is determined that the first object is the face of the person and the second processing instruction is to present the slapped face in a red and turgescent state. Of course, the second processing instruction may also include displaying the action of the slap in the face.

Step 405 is to control, in response to the second processing instruction, to transform the first object displayed by the first display unit and/or a second display unit, and display a third content with the processed first object at the first display unit and/or the second display unit.

The transformation process may be performed on the first object displayed by the first display unit and/or the second display unit under the control, to display the third content with the transformed first object at the first display unit and/or the second display unit, in the case where the second processing instruction is determined. In addition to the transformed first object, the other parts of the third content are the same as that of the second content. The processing for controlling the first display unit and/or the second display unit to transform the displayed first object is similar to that according to the above embodiments.

For example, in the case where the transformed effect of the first object is only presented by the first display unit, the first communication device may perform the transformation process on the first object in the second content displayed by the first display unit, in response to the second processing instruction, and then the first display unit displays the third content including the transformed first object.

The third content with the processed first object may be displayed by the second display unit in two modes. One mode may include: transforming, by the first communication device, the first object in the second content to obtain the third content in response to the second processing instruction, and transmitting the third content to the second communication device. Then, the second display unit of the second communication device displays the third content obtaining by transforming the first object. The other mode may include: transmitting, by the first communication device, the second processing instruction to the second communication device, and indicates the second communication device to transforms the first object in a fourth content displayed by the second display unit in response to the second processing instruction. Then, the second display unit displays the third content with the transformed first object. Thus, after the transformation process is performed on the first object, a user of the second communication device may intuitively see the transformation on the first object, and intuitively feel the feeling or behavior of the user of the first communication device, thereby improving fun in the communication.

For example, a video communication is performed between a user A of the first communication device and a user B of the second communication device. The user A may see a video image of the user B in the first display unit of the first communication device. When the user A slaps a left face of the user B on video image displayed by the first display unit, it may be determined that the first object to be processed in the video image is the left face of the user B, the second processing instruction is to present the left face of the user B in a red and turgescent state. The first communication device may transform the left face of the user B displayed by the first display unit, to obtain the slapped left face in the red and turgescent state, and then obtain and display the processed video image. In this way, the user A may see the effect of the slap in the image, and feel that personally slaps the face of the user B. Further, the first communication device may transmit to the second communication device the video image in which the left face of the user B is in the red and turgescent state, and the second communication device may display the processed video image. Thus, the use B may see the video image in which his left face is in the red and turgescent state, so that the use B may feel the operation the use A want to perform on him. Of course, the first communication device may also transmit the second processing instruction to the second communication device. The second communication device determines, in response to the second processing instruction, that the left face of the user B displayed by the first display unit needs to be transformed to present the left face in the red and turgescent state, and displays the transformed video image to make the use B see the transformed video image.

Similar to the above embodiments, according to this embodiment, the transformation process is performed in response to the second processing instruction to transform a first portion of the first object only currently displayed by the first display unit and/or the second display unit and no transform the first object displayed at the next moment by the first display unit and/or the second display unit.

Further, the transformation process may also be performed, in response to the second processing instruction, to transform the first object displayed by the first display unit and/or the second display unit, in a predetermined period from a current moment. That is, not only the first object currently displayed by the first display unit and/or the second display unit but also the first object displayed at the next moment by the first display unit and/or the second display unit may be transformed until the predetermined period is end.

Further, the transformation process may also be performed, in response to the second processing instruction, to transform the first object displayed by the first display unit and/or the second display unit, in a period from the current moment to a moment when an instruction for canceling a transformation is received. Thus, the first object displayed by the first display unit and/or the second display unit may be transformed, in response to the second processing instruction, so as to display the third content including the transformed first object by the first display unit and/or the second display unit, as long as the instruction for canceling the transformation is not received.

To facilitate understanding of the embodiment of the present disclosure, an example is describes in the following, in which the current moment is indicated to a first moment, the moments after the current moment are indicated to a second moment and a third moment respectively. Firstly, it is taken as an example that video image displayed by the first display unit at the first moment is the video image with the person shown in FIG. 3*a*. The image with the person is a video image collected by a camera of the second communication device. Of course, the video image as shown in FIG. 3*a* may also be displayed by the second display unit of the second communication device. After the user of the first communication device clicks the head of the person in the video image, the second processing instruction for the head of the person is generated by the first communication device. The second processing instruction is to present a scar and a red lump on the head.

Figure 5A:
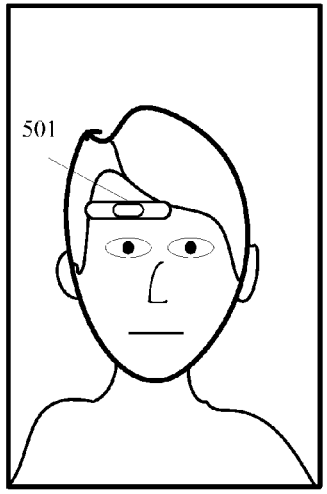
Figure 5A:
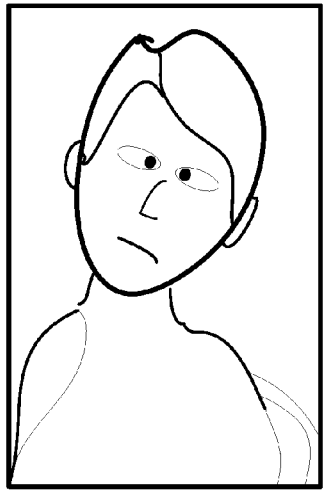
Figure 5A:
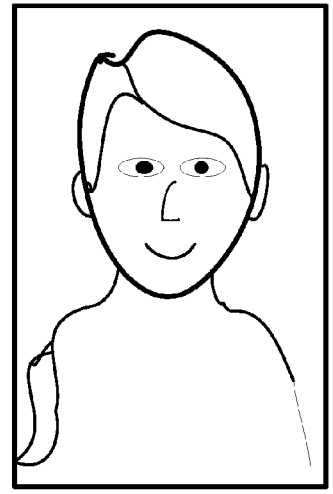
Figure 5B:
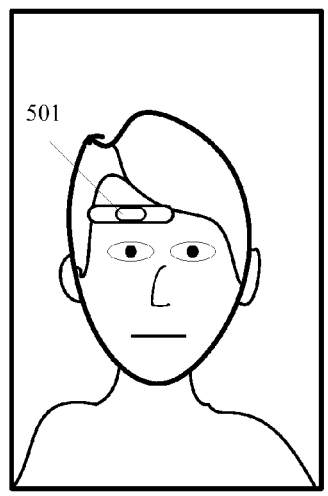
Figure 5B:
Figure 5B:
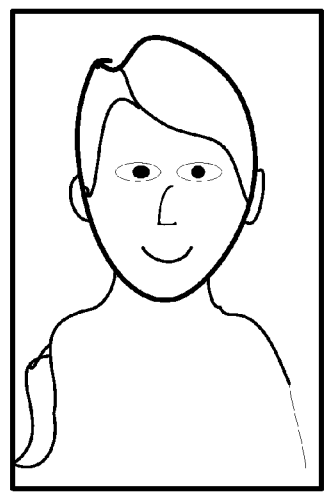

Reference is made to FIGS. 5*a*, 5*b* and 5*c*, which respectively show schematic diagrams of video images displayed at different moment when processes is performed in three different modes in response to the second processing instruction. The FIGS. 5*a*, 5*b* and 5*c* from left to right respectively are the processing results of the video images at the first moment (that is, the current moment corresponding to the image shown in FIG. 3a), the second moment after the current moment and the third moment after the current moment.

The transformed head of the person is displayed under the control by the first display unit of the first communication device or the second display unit of the second communication device at the current moment in response to the second processing instruction, FIG. 5a shows a schematic diagram of the processed first object at the current moment. The images in FIG. 5a from left to right respectively are the image corresponding to the first moment, the image corresponding to the second moment and the image corresponding to the third moment. The head of the person at the first moment is transformed in response to the second processing instruction. Compared with FIG. 3a, a bound wound 501 is occurred on the head of the person in the image corresponding to the first moment in FIG. 5a. However, the head in the video images displayed at the second moment and the third moment after the current moment is not transformed.

The transformed head of the person is displayed under the control by the first display unit or the second display unit in a predetermined period from a current moment, in response to the second processing instruction, as shown in FIG. 5b. It is assumed that the second moment is in the predetermined period from a current moment and the third moment exceeds the predetermined period. Thus, the head of the person displayed at the first moment and the second moment is transformed, so that the scar 501 is occurred on the head of the person displayed at the first moment and the second moment. It may be seen that the position of the head of the person on the image is changed at the second moment, and the transformation performed in response to the second processing instruction follows the display position of the head of the person. For the third moment exceeding the predetermined time period, the head of the person displayed at the third moment is not transformed.

The transformation process is performed on the head of the person displayed by the first display unit or the second display unit before the instruction for canceling the transformation is received, as shown in FIG. 5c. Before the instruction for canceling the transformation is received, the bound wound 501 may be added on the head of the person displayed at the first moment, the second moment and the third moment to display the clicking result on head of the person by the user, even through the position of the head of the person on the image is changed at different moments. Only when the instruction for canceling the transformation is received, the transformation process, such as adding the wound, is not performed on the head of the displayed person any more.

FIGS. 5a, 5b and 5c may be understood as the schematic diagrams of the transformation process performed on the video images displayed by the first display unit, and may also be understood as the schematic diagrams of the transformation process performed on the video images displayed by the second display unit.

The transformed content may be distinguished by the user from the original image by means of a color of the wound added newly.

In the case where the second content displayed by the first display unit and corresponds to the second communication data is a series of characters, the first object may be determined as at least one character in the second content. For example, a text communication is performed between a user A of the first communication device and a user B of the second communication device. In the communication, the first display unit may display the character sent from the use A to the second communication device terminal and the character sent from the user B to the first communication device by using the second communication device. Accordingly, the text contents inputted by the user A and the user B will also be displayed at the second display unit of the second communication device terminal. FIG. 6a shows a schematic diagram of multiple characters which are inputted by the user A and the user B and displayed by the first display unit or the second display unit at a first moment. In FIG. 6a, the characters behind "A:" represent the characters sent from the user A to the second communication device via the first communication device; and the characters behind "B:" represent the characters sent from the user B s to the first communication device via the second communication device. The user of the first communication device terminal may add a word "not" to the position between the word "is" and the word "fine" by using a mouse, a button or directly clicking on the position associated with the multiple characters in the first display unit and inputting the word "not". Thus, the second processing instruction is to add the word "not" to the position between two objects to be processed, i.e. the word "is" and the word "fine".

If the processing is only performed on the object to be processed among the characters displayed at the current moment based on the second processing instruction, the word "not" is added to the position between the word "is" and the word "fine" in the characters displayed at the first moment. The font of the word "not" is different from the other characters in order to distinguish it conveniently, while the character at the second moment and the third moment later than the first moment are not transformed, as shown in FIG. 6b.

Figures 6C, 7A:
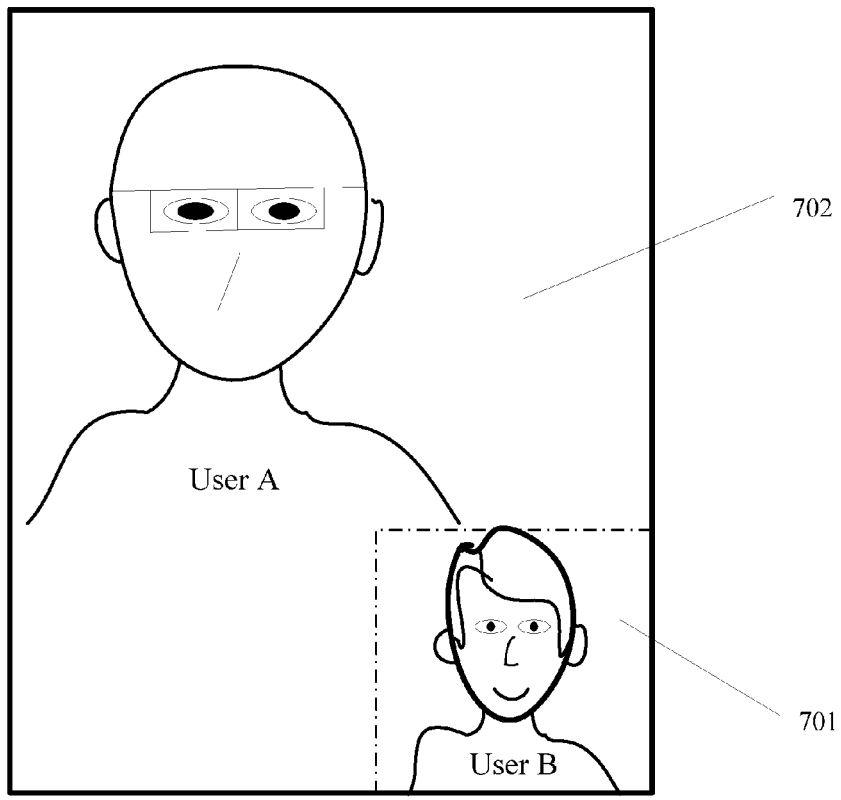

The word "not" is added to the position between the object to be processed in a predetermined period from a current moment or in a predetermined period from the current moment to a moment when an instruction for canceling a transformation is received. Assuming that neither the second moment nor the third moment exceeds the predetermined time period and the instruction for canceling the transformation is not received at the first moment and the second moment. The word "not" is added to the position between the word "is" and the word "fine" displayed at the first moment, and the second and third moments after the first moment, as shown in FIG. 6c. If a fourth moment exceeds the predetermined period or the instruction for canceling the transformation is received at the fourth moment, the word "not" would not be added to the position between the word "is" and the word "fine".

Of course, as the user A uninterruptedly communicates with the user B by text, the characters displayed by the first display unit and/or the second display unit would be moved upward in turn until a certain line of characters moves out of the display unit. In the case where the instruction for canceling the transformation is not received and the predetermined period is not exceeded, the word "not" may be added as long as the line of characters "weather is fine today" is not moved out from the uppermost end of the display unit.

The audio corresponding to the current transformation may also be outputted while the second content is transformed based on the second processing instruction, in order to improve user experience during communication. Thus, the second processing instruction for transforming the second content and an audio processing instruction associated with the transformation may be determined based on the first operation, in the case that the first operation meets the predetermined condition. Correspondingly, the first communication device and/or the second communication device may be controlled to output the corresponding audio based on the audio processing instruction, while the first display unit and/or the second display unit is controlled to display the third content associated with the second content based on the second processing instruction.

For example, the image of the user B of the second communication device is displayed at the first display unit of the first communication device. If the user A slaps the head of the displayed image of the user B, the first communication device adds one red and turgescent bump to the head of the user B displayed by the first display unit. In this way, the transformed image is much like the image in which a red bump occurs due to a real slap for the user B. At the same time, the voice "ah" may be outputted while one red bump is added to the head of the user B in the image, and thus the scene becomes more realistic. Of course, when receiving the second processing instruction, the second communication device may also add one red and turgescent bump to the head of the user B displayed by the second communication device terminal, and at he same time the second communication device outputs the corresponding audio such as "ah" based on the received audio processing instruction. Thus, it seems to slap the user B and scream in reality by combining the audio and the video.

In the actual application, a data interaction is performed between the first communication device and the second communication device, in the case where there is data path between the first communication device and the second communication device. That is, the first communication device would also transmit the data collected locally to the second communication device while the first communication device receives the second communication data from the second communication device.

To collect the data from the first communication device terminal, the first communication device generally includes or is connected to a first collecting unit, such as a webcam or a keyboard. When receiving the second communication data from the second communication device, the first communication device may also collect locally the first communication data by the first collecting unit. Correspondingly, the first communication device displays a first content corresponding to first communication data collected by the first collecting unit, at a first display region of the first display unit; and displays the second content corresponding to the second communication data, at a second display region of the first display unit. The first display region of the first display unit is different from and partially overlaps with the second display region of the first display unit. However, in the case where the first display region partially overlaps with the second display region, it is required to ensure that the first content and the second content may be displayed completely, and thus the user of the first communication device may see the first content and the second content completely.

Similarly, the second communication device may also display the content corresponding to the second communication data at a third display region of the second display unit; while displaying the content corresponding to the first communication data from the first communication device, at a fourth display region of the second display unit.

For example, during the video communication between the user A of the first communication device and the user B of the second communication device, the image of the user B may be displayed at a display region of the first display unit of the first communication device, while the image of the local user A may be displayed in another display region of the first display unit. The second communication device may also display the images of the user A and the user B in two display regions of the second display unit, respectively.

After the second processing instruction corresponding to the second content is determined based on the first operation, when the first display unit and/or the second display unit is controlled to display the third content associated with the second content in response to the second processing instruction, a display area of the display region for displaying the third content in the first display unit and/or a display area of the display region for displaying the third content in the second display unit may be adjusted under the control. It is ensured that the user of the first communication device and/or the user of the second communication device can see the transformed third content clearly.

Specifically, the process of controlling to display the second content in the first display unit includes: controlling, in response to the second processing instruction, to display the third content associated with the second content at the second display region of the first display unit; and adjusting a display area of the second display region. For example, the display area of the second display region is increased. Generally, in the first communication device terminal, the area of the second display region for displaying the second content corresponding to the second communication data is greater than the area of the first display region for displaying the first content corresponding to the first communication data collected locally. Thus, the display area of the second display region may not be adjusted.

Specifically, the process of controlling to display the second content in the second display unit includes: controlling, in response to the second processing instruction, to display the third content corresponding to the second content at the third display region of the second display unit; and triggering the second communication device to adjust a display area of the third display region. Generally, in the second display unit of the second communication device terminal, the area of the third display region for displaying the second content corresponding to the second communication data is less than the area of the fourth display region of the second display unit for displaying the first content corresponding to the first communication data. Thus, it may facilitate the user of the second communication device to see the third content displayed in the third display region by controlling the second communication device to adjust the area of the third display area.

Figure 7B:
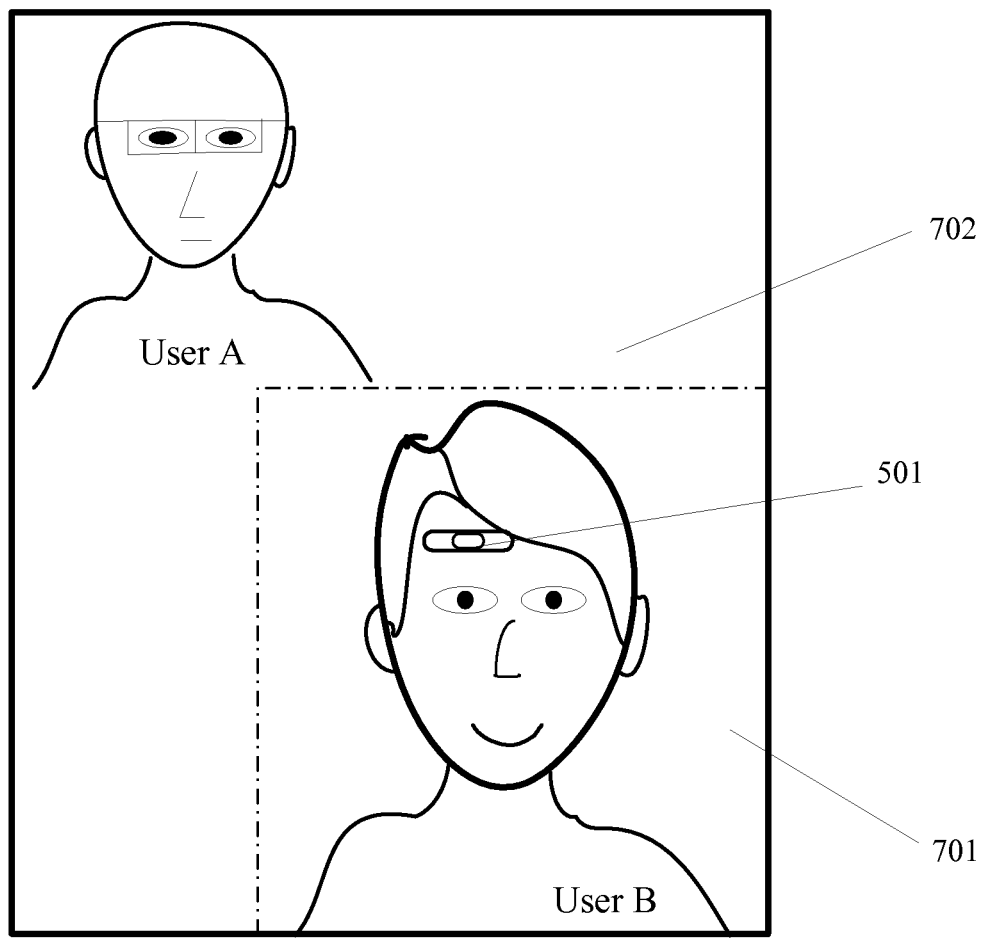

For example, still taking the video communication between the user A of the first communication device and the user B of the second communication device as an example. Generally, the images of the user A and the user B are displayed in the second display unit of the second communication device terminal, as shown in FIG. 7a. It may be seen that the image of the user B is displayed in the third display region 701 of the second display unit, and the image of the user A is displayed in the fourth display region 702 of the second display unit as shown in FIG. 7a. If the second processing instruction determined based on the first operation obtained by the first communication device is adapted to add one bound wound to the forehead of the user B, the second communication device processes the head of the user B in the third display region 701 of the second display unit in response to the second processing instruction, to add a wound 501 to the forehead of the user B. The second communication device may also increase the display area of the third display region, such that the user B of the second communication device may see the change of its image in the third display region, as shown in FIG. 7b.

The first communication device may also transmit the first communication data collected by the first collecting unit to the second communication device, to display the first content corresponding to the first communication data in a fourth display region of the second display unit. Thus, the user of the second communication device may see the content corresponding to the first communication data collected by the first collecting unit of the first communication device. The fourth display region is different from the third display region. In addition, the fourth display region may partially overlap with the third display region, but it is required to ensure that the content in the third display region and the fourth display region may be displayed completely.

Furthermore, the first communication device may also collect a second operation of the user of the first communication device on the first content by using the first input unit; and determine a first processing instruction for transforming the first content based on the second operation, in the case where the second operation meets a second predetermined condition. That is, the second operation is used to the first content corresponding to the data collected locally by the first communication device terminal, and the first processing instruction is the processing instruct for transforming the first content. After the first processing instruction is determined, the first communication device may control to display the transformed first content in the first display region of the first display unit and/or the fourth display region of the second display unit, in response to the first processing instruction.

If the transformed first content needs to be displayed in the first display region of the first display unit, the first communication device, in response to the first processing instruction, transforms the first content in the first display region and displays the transformed first content. Thus, the user of the first communication device may see the transformed result of the content corresponding to the data collected locally.

If the transformed first content needs to be displayed in the fourth display region of the second display unit, the first communication device may transform the first content in response to the first processing instruction; and transmit the transformed first content to the second communication device, to display the transformed first content in the fourth display region of the second display unit. Alternatively, the first communication device transmits the first processing instruction to the second communication device, and the second communication device transforms the first content displayed in the fourth display region, in response to the first processing instruction.

Figure 8:
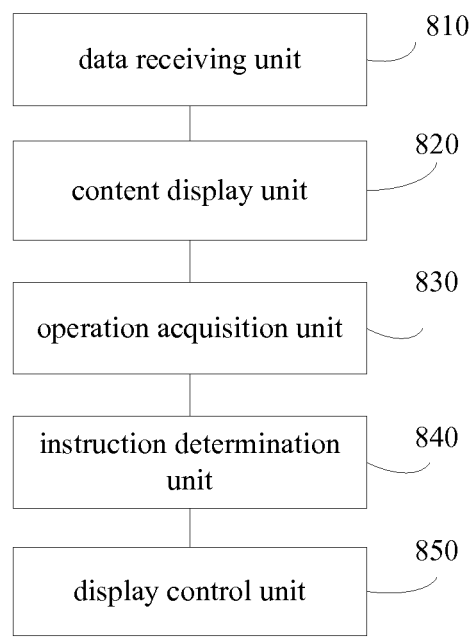
FIG. 8 shows a structural schematic diagram of a data processing apparatus according to an embodiment of the disclosure.

Corresponding to the data processing method according to the disclosure, the disclosure further provides a data processing apparatus. Referring to FIG. 8, a structural schematic diagram of a data processing apparatus according to an embodiment of the disclosure is shown. The apparatus according to the embodiment is applied a first communication device which includes or is connected to a first display unit and a first input unit. The apparatus according to the embodiment includes a data receiving unit 810, a content display unit 820, an operation acquisition unit 830, an instruction determination unit 840 and a display control unit 850.

The data receiving unit 810 is configured for receiving second communication data from a second communication device, in the case where a data path is established between the first communication device and the second communication device. The second communication device includes or is connected to a second collecting unit and the second communication data is collected by the second collecting unit.

The content display unit 820 is configured for displaying a second content corresponding to the second communication data by the first display unit.

The operation acquisition unit 830 is configured for collecting a first operation of a user of the first communication device by the first input unit.

The instruction determination unit 840 is configured for determining, based on the first operation, a second processing instruction for transforming the second content, in the case where the first operation meets a first predetermined condition.

The display control unit 850 is configured for controlling, in response to the second processing instruction, the first display unit and/or a second display unit to display a third content associated with the second content, wherein the second communication device includes or is connected to the second display unit.

The display control unit may include one or more of a first display control unit and a second display control unit.

The first display control unit is configured for transforming, in response to the second processing instruction, the second content displayed by the first display unit into the third content.

The second display control unit is configured for transmitting the second processing instruction to the second communication device. The second communication device transforms a content displayed by the second display unit and associated with the second communication data into the third content, in response to the second processing instruction.

Furthermore, the first display control unit may include:

a first display control sub-unit configured for transforming, in response to the second processing instruction, the second content displayed by the first display unit into the third content, and transmitting the third content to the second communication device. The second display unit displays the third content.

In the embodiment, in the case where the data path is established between the first communication device and the second communication device, a transformation process of the second content corresponding to the second communication data from the second communication device terminal may be triggered by a specific operation, if the user of the first communication device wants to improve the interactivity in the communication. Therefore, the third content obtained by the transformation and associated with the second content may be displayed by the first display unit of the first communication device terminal and/or the second display unit of the second communication device terminal. Therefore, the possibility to change the content of the opposite terminal data is provided, hence improving interactivity and fun during communication.

The instruction determination unit may be configured for determining, in response to the second processing instruction, a transforming mode for the second content. The transforming mode may include an addition, modification and/or deletion of an object in a set region of the second content. Thus, the display control unit may be configured for controlling, in response to the second processing instruction, the first display unit and/or the second display unit to display the third content transformed from the second content in the determined transforming mode.

Figure 9:
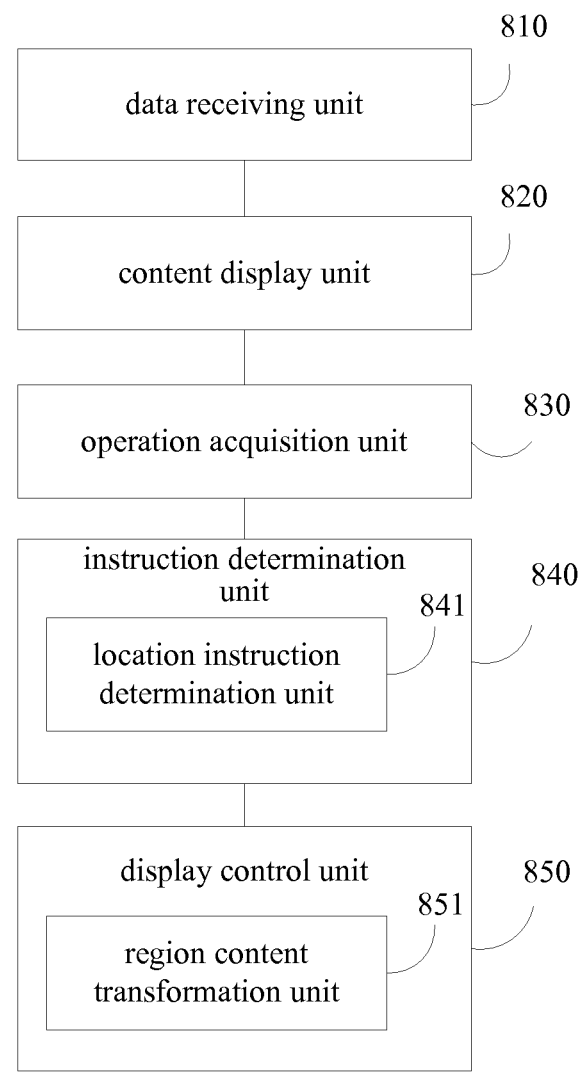
FIG. 9 shows a structural schematic diagram of a data processing apparatus according to another embodiment of the disclosure.

Referring to FIG. 9, a structural schematic diagram of a data processing apparatus according to another embodiment of the disclosure is shown. The data processing apparatus according to the embodiment differs from the data processing apparatus according to according to the embodiment shown in FIG. 8 as following.

In the present embodiment, the instruction determination unit 840 includes:

a location instruction determination unit 841 configured for determining, based on the first operation, a location region to be processed in the second content, and determining the second processing instruction for transforming a content in the location region to be processed, in the case where the first operation meets the first predetermined condition.

Correspondingly, the display control unit 850 includes:

a region content transformation unit 851 configured for controlling, in response to the second processing instruction, to transform a content in the location region to be processed in the second content displayed by the first display unit and/or a content in the location region to be processed in forth content displayed by the second display unit and associated with the second communication data. The first display unit and/or the second display unit display the third content.

The region content transformation unit may include any one of: a first region content transformation unit, a second region content transformation unit and a third region content transformation unit.

The first region content transformation unit is configured for controlling to transform the content in the location region to be processed in the second content currently displayed by the first display unit and/or the content in the location region to be processed in the forth content currently displayed by the second display unit.

The second region content transformation unit is configured for controlling to transform the content in the location region to be processed in the second content displayed by the first display unit and/or the content in the location region to be processed in the forth content displayed by the second display unit, in a predetermined period from a current moment.

The third region content transformation unit is configured for controlling to transform the content in the location region to be processed in the second content displayed by the first display unit and/or the content in the location region to be processed in the forth content displayed by the second display unit, in a period from the current moment to a moment when an instruction for canceling the transformation is received.

Figure 10:
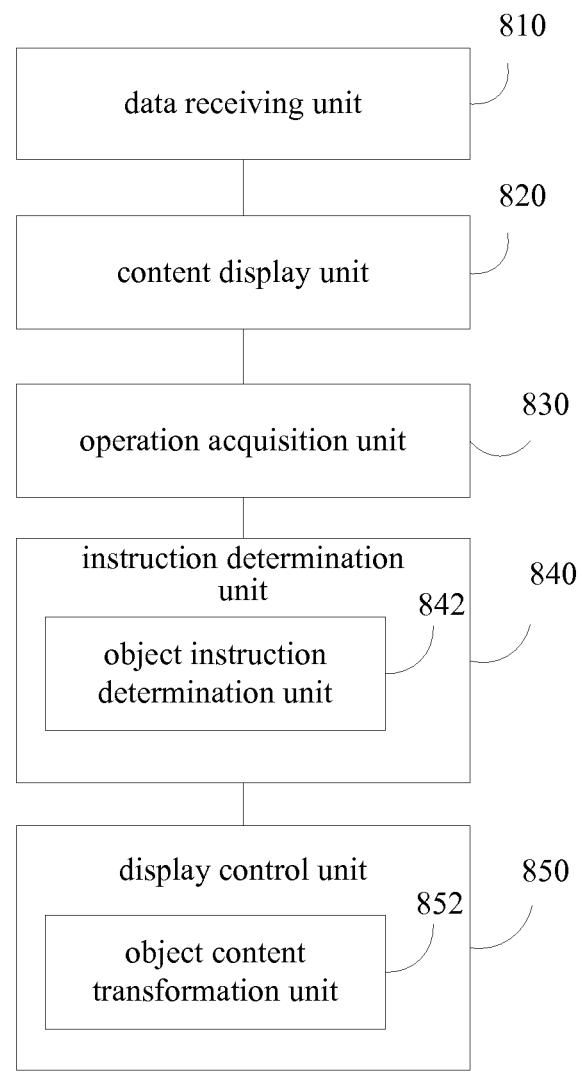
FIG. 10 shows a structural schematic diagram of a data processing apparatus according to yet another embodiment of the disclosure.

Referring to FIG. 10, a structural schematic diagram of a data processing apparatus according to yet another embodiment of the disclosure is shown. The data processing apparatus according to the present embodiment differs from the data processing apparatus according to according to the embodiment shown in FIG. 8 as following:

In the present embodiment, the instruction determination unit 840 includes:

an object instruction determination unit 842 configured for determining, based on the first operation, a first object to be processed in the second content and the second processing instruction for the first object, in the case where the first operation meets the first predetermined condition.

Correspondingly, the display control unit 850 includes:

an object content transformation unit 852 configured for controlling, in response to the second processing instruction, to transform the first object displayed by the first display unit and/or the second display unit, and displaying the third content with the processed first object by the first display unit and/or the second display unit.

The object content transformation unit may include any one of: a first object content transformation unit, a second object content transformation unit, and a third object content transformation unit.

The first object content transformation unit is configured for controlling, in response to the second processing instruction, to transform a first portion of the first object currently displayed by the first display unit and/or the second display unit.

The second object content transformation unit is configured for controlling, in response to the second processing instruction, to transform the first object displayed by the first display unit and/or the second display unit, in a predetermined period from a current moment.

The third object content transformation unit is configured for controlling, in response to the second processing instruction, to transform the first object displayed by the first display unit and/or the second display unit in a period from the current moment to a moment when an instruction for canceling a transformation is received.

In any of the above-mentioned embodiments of the disclosure, the type of data received by the data receiving unit may be different. In the case where the data receiving unit receives video data, the data receiving unit may include: a video data receiving unit configured for receiving second video data from the second communication device, in the case where a video communication path is established between the first communication device and the second communication device. The second video data is collected by the second collecting unit.

Correspondingly, the content display unit may include: a video image display unit configured for displaying a second video image corresponding to the second video data by the first display unit.

The display control unit may include:

a video image display control unit configured for controlling, in response to the second processing instruction, to perform an image transformation process on the second video image displayed by the first display unit and/or a fourth video image displayed by the second display unit, and display a third video image by the first display unit and/or the second display unit, wherein the image content in the fourth video image is the same as the image content in the second video image.

The data receiving unit may also receive character data. In this case, the data receiving unit may include: a character data receiving unit configured for receiving the second communication data from the second communication device, in the case where a video communication path is established between the first communication device and the second communication device. The second communication data includes at least one character to be output.

Correspondingly, the content display unit may include: a character display unit configured for outputting, by the first display unit, the character to be output in the second communication data.

The display control unit may include: a character display control unit configured for controlling, in response to the second processing instruction, to change a rendering effect of the character output by the first display unit and/or the second display unit.

In order to improve the experience of the user in the transformation effect, the instruction determination unit is configured for determining, based on the first operation, the second processing instruction for transforming the second content and an audio processing instruction associated with the corresponding transformation.

Correspondingly, the apparatus may further include: an audio output control unit configured for the controlling, in response to the audio processing instruction, the first display unit and/or a second display unit to output corresponding audio, when the display control unit controls the first display unit and/or the second display unit to display the third content associated with the second content.

Furthermore, in any one of the above-mentioned embodiments, the first communication device to which the apparatus is applied includes or is connected to a first collecting unit.

The content display unit is configured for displaying, in a first display region of the first display unit, a first content corresponding to first communication data collected by the first collecting unit, and displaying, in a second display region of the first display unit, the second content corresponding to the second communication data.

Correspondingly, the display control unit is configured for controlling, in response to the second processing instruction, to display the third content associated with the second content in the second display region of the first display unit, wherein the second display region is different from the first display region; and/or controlling, in response to the second processing instruction, the second communication device to display the third content corresponding to the second content in a third display region of the second display unit, and triggering the second communication device to adjust a display area of the third display region.

Moreover, the disclosure further provides an electronic device, including or being connected to a first display unit. A first communication device includes or is connected to a first input unit, both the first display unit and the first input unit are connected to a processor of the electronic device, and the data processing apparatus according to any one of the above-mentioned embodiments is built in the processor.

The embodiments of the present disclosure are described herein in a progressive manner, with an emphasis placed on explaining the difference between each embodiment and the other embodiments; hence, for the same or similar parts among the embodiments, they may be referred to from one another. For the apparatus disclosed in the embodiments, the corresponding descriptions are relatively simple because the apparatus corresponds to the methods disclosed in the embodiments. The relevant portions may be referred to the description for the method parts.

It should also be noted that, the relationship terminologies such as first and second and the like are only used herein to distinguish an entity or operation from another entity or operation, and it is not necessarily required or implied that there are any actual relationship or order of this kind between those entities and operations. Moreover, the terminologies of 'comprise', 'include', and any other variants are intended to cover the non-exclusive contains so that the processes, methods, articles or equipment including a series of elements not only include those elements but also include other elements that are not listed definitely or also include the elements inherent in the processes, methods, articles or equipment. In the case of no more restrictions, the elements defined by the statement 'include one . . . ' do not exclude that other same elements also exist in the processes, methods, articles or equipment including the elements.

The above description of the embodiments of the disclosure enables those skilled in the art to implement or use the present disclosure. Numerous modifications to the embodiments are apparent to those skilled in the art, and the general principle defined herein may be implemented in other embodiments without deviation from the spirit or scope of the present disclosure. Therefore, the present disclosure is not limited to the embodiments described herein, but in accordance with the widest scope consistent with the principle and novel features disclosed herein.

The invention claimed is:

1. A data processing method, applied to a first communication device which comprises or is connected to a first display unit and a first input unit, wherein the method comprises:

receiving second communication data from a second communication device, in the case where a data path is established between the first communication device and the second communication device, wherein the second communication device comprises or is connected to a second collecting unit and the second communication data is collected by the second collecting unit;

displaying, by the first display unit, a second content corresponding to the second communication data from the second communication device;

collecting, by the first display unit, a first operation of a user of the first communication device;

determining, based on the first operation, a second processing instruction for transforming the second content to a third content, in the case where the first operation meets a first predetermined condition, wherein the second processing instruction includes information identifying a region of the second content to be altered and transformation instruction to transform the identified region such that the second content is transformed to the third content; and in response to the second processing instruction, transforming, by the first communication device, the second content to the third content, and controlling, by the first communication device, the first display unit to display the third content obtained by transforming the second content in a period from the current moment to a moment when an instruction for canceling a transformation is received; and transmitting, by the first communication device, the second processing instruction to the second communication device which comprises or is connected to a second display unit, wherein the second display unit displays a content that is based on the second communication data, and the second communication device, in response to the second processing instruction, transforms the content being displayed by the second display unit to the third content based on the second processing instruction and controls the second display unit to display the third content.

2. The method according to claim 1, wherein the determining, based on the first operation, the second processing instruction for transforming the second content, in the case where the first operation meets the first predetermined condition further comprises:

determining, based on the first operation, a first object that is located in the identified region of the second content and is to be processed; and determining the transformation instruction for transforming the first object to the third content; and the transforming the second content and controlling the first display unit to display the third content obtained by transforming the second content comprises: controlling transformation of the first object displayed by the first display unit based on the second processing instruction and displaying the transformed first object having the third content.

3. The method according to claim 1,
wherein the second communication data comprises second video data which is collected by the second collecting unit;
wherein the second content comprises a second video image corresponding to the second video data; and
wherein the transforming the second content and controlling the first display unit to display the third content obtained by transforming the second content further comprises:
controlling, in response to the second processing instruction, transformation of the second video image displayed by the first display unit, and displaying a third video image on the first display unit.

4. The method according to claim 1,
wherein the second communication data comprises at least one character to be output;
wherein the displaying, by the first display unit, the second content corresponding to the second communication data further comprises:
outputting, by the first display unit, the character to be output in the second communication data; and
wherein the transforming the second content and controlling the first display unit to display the third content obtained by transforming the second content further comprises:
changing, in response to the second processing instruction, a rendering effect of the character output to be displayed by the first display unit.

5. The method according to claim 1, wherein the transforming the second content and controlling the first display unit to display the third content obtained by transforming the second content further comprises:
determining, in response to the second processing instruction, a transforming mode for the second content, wherein the transforming mode comprises at least one of an addition, modification or deletion of an object in the region of the second content.

6. The method according to claim 1, wherein the first communication device comprises or is connected to a first collecting unit;
the displaying, by the first display unit, the second content corresponding to the second communication data further comprises:
displaying, in a first display region of the first display unit, a first content corresponding to first communication data collected by the first collecting unit, and
displaying, in a second display region of the first display unit, the second content corresponding to the second communication data; and
the transforming the second content and controlling the first display unit to display the third content obtained by transforming the second content further comprises:
displaying the third content associated with the second content in the second display region of the first display unit, wherein the second display region is different from the first display region.

7. The method according to claim 6, wherein when the receiving second communication data from the second communication device in the case where the data path is established between the first communication device and the second communication device, the method further comprises:
transmitting the first communication data collected by the first collecting unit to the second communication device, wherein the first content corresponding to the first communication data is displayed at a fourth display region of the second display unit, and the fourth display region is different from a third display region;
collecting, by the first input unit, a second operation of the user of the first communication device on the first content;
determining, based on the second operation, a first processing instruction for transforming the first content, in the case where the second operation meets a second predetermined condition; and
displaying, in response to the first processing instruction, the transformed first content in at least one of the first display region of the first display unit or the fourth display region of the second display unit.

8. A data processing apparatus applied to a first communication device which comprises or is connected to a first display unit and a first input unit, wherein the data processing apparatus comprises:
a memory storing computer-readable instructions;
one or more processors, wherein the one or more processors are configured to execute the computer-readable instructions to:
receive second communication data from a second communication device, in the case where a data path is established between the first communication device and the second communication device, wherein the second communication device comprises or is connected to a second collecting unit and the second communication data is collected by the second collecting unit;
display a second content corresponding to the second communication data on the first display unit;
receive a first operation of a user of the first communication device by way of the first input unit;
determine, based on the first operation, a second processing instruction for transforming the second content to a third content, in the case where the first operation meets a first predetermined condition, wherein the second processing instruction includes information identifying a region of the second content to be altered and transformation instruction to transform the identified region such that the second content is transformed to the third content; and
in response to the second processing instruction, transform the second content and control the first display unit to display the third content obtained by transforming the second content in a period from the current moment to a moment when an instruction for canceling a transformation is received; and
transmit, by the first communication device, the second processing instruction to the second communication device which comprises or is connected to a second display unit, wherein the second display unit displays a content that is based on the second communication data, and the second communication device, in response to the second processing instruction, transforms the content being displayed by the second display unit to the third content based on the second processing instruction and controls the second display unit to display the third content.

9. The apparatus according to claim 8, wherein to determine, based in the first operation, the second processing instruction for transforming the second content, the processors further execute instructions to:
determine, based on the first operation, a first object that is located in the identified region of the second content and is to be processed; and determine the transformation instruction for transforming the first object to the third content; and to transform the second content and control the first display the third content obtained by transforming the second content, the processors execute instructions to: control, in response to the second processing instruction, transformation of the first object displayed on the first display unit.

10. The apparatus according to claim 8, wherein:

to receive second communication data from a second communication device, the processors execute instructions to receive second video data from the second communication device, in the case where a video communication path is established between the first communication device and the second communication device, wherein the second video data is collected by the second collecting unit;

to display the second content corresponding to the second communication data on the first display unit, the processors execute instructions to display a second video image corresponding to the second video data by the first display unit; and to transform the second content and control the first display unit to display the third content obtained by transforming the second content, the processors execute instructions to control, in response to the second processing instruction, transformation of an image transformation process on the second video image displayed on the first display unit, and display a third video image on the first display unit.

11. The apparatus according to claim 8, wherein:

in the case where a video communication path is established between the first communication device and the second communication device, the second communication data comprises at least one character to be output;

to display the second content corresponding to the second communication data by the first display unit, the processors execute instructions to output, on the first display unit, the character to be output in the second communication data; and to transform the second content and control the first display unit to display the third content obtained by transforming the second content, the processors execute instructions to change, in response to the second processing instruction, a rendering effect of the character output on the first display unit.

12. The apparatus according to claim 8, wherein the first communication device comprises or is connected to a first collecting unit;

to display the second content corresponding to the second communication data on the first display unit, the processors execute instructions to display, in a first display region of the first display unit, a first content corresponding to first communication data collected by way of the first collecting unit, and display the second content corresponding to the second communication data in a second display region of the first display unit; and to transform the second content and control the first display unit to display the third content obtained by transforming the second content, the processors execute instructions to display, in response to the second processing instruction, the third content associated with the second content in the second display region of the first display unit, wherein the second display region is different from the first display region.

13. The method according to claim 1, wherein in response to the second processing instruction, to transform the second content and control the first display unit to display the third content obtained by transforming the second content the processors execute instructions to:

enlarge a second display region of the first display unit and display the third content associated with the second content in the enlarged second display region of the first display unit.

14. A data processing method, applied to a first communication device including a first display unit and a first input unit, the method comprising:

communicating with a second communication device by way of a data path, wherein the second communication device includes a second collecting unit that collects second communication data and a second display unit;

receiving the second communication data from the second communication device;

displaying, by the first display unit, a second content that is based on the second communication data;

collecting, by the first display unit, a first operation of a user of the first communication device;

determining, in response to the first operation, whether the first operation meets a predetermined condition;

in response to the first operation meeting the predetermined condition, determining second processing instruction for transforming the second content to a third content based on the first operation, wherein the second processing instruction includes information identifying a region of the second content to be altered and transformation instruction to transform the identified region such that the second content is transformed to the third content; and transforming, by the first communication device, the second content to the third content based on the second processing instruction, controlling, by the first communication device, the first display unit to display the third content obtained by transforming the second content in a period from the current moment to a moment when an instruction for canceling a transformation is received; and transmitting, by the first communication device, the second processing instruction to the second communication device, wherein the second display unit displays a content that is based on the second communication data, and the second communication device, in response to the second processing instruction, transforms the content being displayed by the second display unit to the third content based on the identified region and the transformation instruction and controls the second display unit to display the third content.

15. The method according to claim 14, further comprising determining the region of the second content to be transformed based on an operation location of the first operation.

* * * * *